Patented Nov. 30, 1937

2,100,377

UNITED STATES PATENT OFFICE 2,100,377

ARTICLE OF MANUFACTURE AND METHOD OF MAKING SAME

Merlin Martin Brubaker, Wilmington, Del., assignor, by mesne assignments, to E. I. du Pont de Nemours & Company, Wilmington, Del., a corporation of Delaware No Drawing. Application May 31, 1934, Serial No. 728,455

10 Claims. (Cl. 91—68)

This invention relates to new compositions of matter which are useful for the preparation of sheets or films or for the coating of various articles. Particularly, the invention relates to waterproofing and moistureproofing compositions and to waterproof and moistureproof materials, especially of pellicular nature such as are useful as wrapping tissues, which can be prepared through the use of these compositions.

In accordance with the prior art, numerous compositions of matter have been provided which have been designed to be resistant to the action of water in the sense of water-repellancy. More recently there have been provided compositions of matter capable of forming sheets, films or coatings which are resistant to the passage therethrough of water vapor in addition to being water-repellant. Compositions of matter of this latter type comprise a film-forming substance and a substance which serves as the basis for the ultimate moistureproofness, usually referred to as the moisture-proofing agent. In one preferred embodiment, these compositions comprise a cellulose derivative and a wax or wax-like substance, together with a resin or blending agent and a plasticizer for the cellulose derivative.

It has now been found that particularly advantageous moistureproofing compositions can be prepared with the use of certain synthetic film-forming resins in place of the cellulose derivative previously employed. These synthetic resins are remarkably inert to chemical and physical influences such as heat, light, water, acids and alkalies; they resemble in some respects certain cellulose ethers or esters; and unlike most synthetic resins they do not, except in special instances, harden by heat, atmospheric oxygen or other external influences. They are capable of forming continuous films, when cast from solution, by evaporating the solvents, and the hardness of the resins (and consequently to a considerable extent the hardness of films containing them) is controlled almost entirely by the selection of ingredients, the extent of condensation and other preparative conditions.

The synthetic resins of the type described are obtainable by the combination of polyhydric phenols and aliphatic polyhalides. These resins are characterized by ether linkages which enter into the molecular structure and consequently they may be referred to conveniently as "polyether resins". The details of their preparation and properties are set forth in co-pending application of J. A. Arvin, Serial No. 651,634, filed January 13, 1933. Any of the resins described in said Arvin application will be found useful in the practice of the present invention.

It is an object of this invention to provide new compositions of matter suitable for use in the preparation of sheets or films, or useful for the coating of various articles, said compositions comprising a polyether resin and a moistureproofing agent.

It is also an object of this invention to provide a moistureproofing composition comprising a polyether resin and a moistureproofing agent, with or without other modifying ingredients such as blending agents, other resins, plasticizers or the like, and capable of yielding transparent, flexible, non-tacky, oilproof, greaseproof, waterproof and moistureproof sheets, films or coatings.

It is another object of this invention to provide a moistureproof, flexible, and preferably transparent sheet or film suitable for use as a wrapping tissue, comprising a base sheet coated with a composition comprising a polyether resin and a moistureproofing agent.

Another object of this invention is to provide a composition of matter which can be cast into the form of films, filaments, tubes, caps or the like, to produce a waterproof, flexible, moistureproof, and preferably transparent, structure.

A specific object of the invention is to provide a sheet or film comprising a base of cellulosic material coated with a composition comprising a polyether resin and a moisture-proofing agent, the product being waterproof, flexible, non-tacky, moistureproof and preferably transparent and especially useful as a wrapping tissue.

The above and other objects will be apparent from the following description.

The synthetic resins used in the practice of this invention are the reaction products of polyhydric phenols and polyhalides whose halogen atoms are attached to aliphatic carbon atoms. The halides are organic compounds having at least two carbon atoms and at least two reactive halogen atoms, the latter preferably being attached to different carbon atoms. The carbon atoms must be joined to other atoms by single bonds only. The resins are best made by condensing an alkali metal or alkaline-earth metal salt of the polyhydric phenol with the polyhalide.

Resins prepared from the following combinations of ingredients are particularly useful in the practice of the present invention because of their toughness, flexibility and good adhesion:

Resin A from di(4-hydroxyphenyl) dimethylmethane

Resin B from di(4-hydroxy-3-methylphenyl) dimethylmethane

Resin C from 1,1-di(4-hydroxyphenyl)cyclohexane

Resin D from di(4-hydroxynaphthyl)dimethylmethane.

Resin E from di(4-hydroxyphenyl)naphthane-2 using B,B'-dichlorodiethyl ether as the polyhalide for each resin.

The polyhydric phenol is mixed with an aqueous solution of the theoretical or a slightly excess quantity of alkali and heated at a relatively high temperature, above 70° C. and preferably above 100° C., but below the decomposition temperatures of the ingredients, with a chemically equivalent amount of the polyhalide. The apparatus preferably consists of a vessel fitted with a thermometer, reflux condenser, and a stirrer designed to sweep the sides and bottom of the vessel. Heating is continued until the desired state of condensation is obtained or until as much of the phenol and halide are reacted as possible. The phenol is largely reacted when the amount of acid to neutralize a definite weight sample becomes essentially constant; where the theoretical amount of alkali was used originally, the final product is nearly neutral. (This method of following the progress of the resinification, however, is sometimes only approximate since part of the alkali may be used up in the hydrolysis of the polyhalide, a side reaction which does not contribute to the resinification). Tests can be made for uncombined halide by distilling a few drops from the reaction vessel (when the halide is volatile). If this distillate is cloudy, some of the halide is uncombined and refluxing is continued. When the distillate is clear, the water can be distilled off without loss of halide; this will then permit the use of higher temperatures in the later stages of the reaction with a resultant decrease in time of preparation. Further heating after the distillate becomes clear is generally necessary, inasmuch as this "clear" point only shows that essentially all the halide has been combined by the elimination of at least one of its halogen atoms, but not necessarily all of them. The final reaction mass is very viscous, also opaque because of occluded salt. When it has reached the desired consistency, the hot mass is poured into a steam-jacketed Werner-Pfleiderer type mixer and washed with small portions of dilute hydrochloric acid and finally with water to remove the salt. The resin is then dried, either in vacuo or at atmospheric pressure, for several hours at temperatures above its melting point, e. g., in the range 100–150° C. Clear tough resins are obtained whose hardness will depend largely on the temperature, time of reaction, and certain other details.

As a specific example, the preparation of resin A may be described as follows:

| | Parts |
|---|---|
| Di(4-hydroxyphenyl)dimethylmethane (M. P. 157° C.) | 456 |
| Dichlorodiethyl ether | 286 |
| Water | 450 |
| Sodium hydroxide (50%) | 326 |

The above mixture is refluxed in an atmosphere of nitrogen or water vapor for 10–15 hours with stirring or until a few drops of clear distillate shows that there is no remaining free halide. The water is distilled off over a period of two hours, the temperature finally being carried to 225–230° C. and maintained at this point for 12 hours. The mass is now very viscous and pasty. It is poured while hot into a steam-jacketed Werner-Pfleiderer mixer, washed three times with water, then with small portions of dilute hydrochloric acid until the washings are acid to Congo red and finally with water again until the washings are substantially free of chloride ion. The product is then dried by heating in vacuo at 120–125° C. for 16 hours. The resin is hard, clear, pale-colored and extremely tough, and is inert to acid, alkali, water and light. It is insoluble in alcohol and aliphatic hydrocarbons, but soluble in toluol, xylol and aromatic esters such as dibutyl phthalate. Films dry to a hard, non-tacky condition in a very few minutes by simple evaporation of solvent; in this respect, the resin resembles cellulose derivatives. The resin does not mix readily with oils and most cellulose derivatives, but is compatible with benzyl cellulose. The resin does not heat-harden (like a phenol-formaldehyde resin) nor dry by oxidation (like a drying oil modified polyhydric alcohol-polybasic acid resin).

In the same way, resin B can be prepared, using, however, the ingredients in the following proportions:

| | Parts |
|---|---|
| Di(4-hydroxy-3-methylphenyl)dimethylmethane | 448 |
| B,B'-dichlorodiethyl ether | 250 |
| Sodium hydroxide (50%) | 286 |
| Water | 415 |

It should be understood that other polyhydric phenols and other polyhalides of the character described may be used to prepare polyether resins suitable for use in the present invention. Thus, any of the resins disclosed in the co-pending application referred to above are to be considered as within the scope of the present invention. Thus, some of the useful phenols for making the resin, other than those mentioned above, include resorcinol, catechol, P,P'-dihydroxydiphenyl, dihydroxynaphthalenes, di(4-hydroxyphenyl)phenylmethane, di(4-hydroxy-3-chlorophenyl)dimethylmethane, di(4-hydroxyphenyl)sulfone and sulfide, etc.

Various polyhalides in addition to or instead of those mentioned may likewise be used to make the resin. Among these are B,B'dichlorodipropylether, 1,4-dichlorocyclohexane, 1,4,7-trichloroheptane, dichlorodiethylamine, xylylene dibromide, propylene dichloride, glycerol-α-γ-dichlorhydrin, hexamethylene dibromide, etc. Bromides and iodides are in many cases more active than the chlorides but are less economical. Apparently the only requisite is that the halogen atoms be sufficiently reactive to combine with the phenol, through the alkali salt of the phenol or some other common method for making ethers. It is a well known fact of chemistry that there are definite types of halogen atoms which are not readily hydrolyzed nor generally considered to be reactive, such as those attached to carbons which are joined in turn to other carbons by means of a double bond, an illustration being the chlorine atom of vinyl chloride, and the halogen atoms attached to aromatic nuclei. Reactive halogen atoms, as the term is used herein, are therefore those which are attached to carbon atoms which in turn are joined to other atoms by means of only single bonds. Only polyhalides having two or more carbons are operable for making the polyether resins. The halogen atoms are preferably attached to different carbons to avoid the formation of acetal-like structures which, although of the ether-type, are more susceptible to hydrolysis.

By "polyhydric phenol", as used in the present specification, is meant a phenolic body having at least two phenolic hydroxyls, the phenolic body not being readily converted on heat treatment to an infusible or insoluble product.

The resins mentioned above are, as disclosed in the Arvin co-pending application above referred to, ether resins which may be defined structurally as having a recurrence of the grouping —X—O—Y—O— where X is a bivalent organic radical whose atoms adjacent to oxygen are aromatic carbon atoms, O is oxygen, and Y is a bivalent organic radical whose atoms adjacent to oxygen are non-aromatic carbon atoms joined to other atoms by single bonds only. X may be an aryl group or it may have other substituents or components. The preferred resins obtained from dihydric phenols and dihalides may be formulated thus:

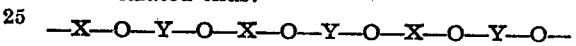

and apparently contain substantially all of the structural units in linear chains. The resins are extremely resistant to chemical action including that of strong acids and alkalis. However, on very drastic treatment with strong hydrobromic or hydriodic acids, such as long-continued boiling, the aromatic ether linkages can be split, although with difficulty, and a mixture of products comprising a polyhydric phenol and an aliphatic halide (of the type defined as being operable for making the resin) will be obtained.

As pointed out in the above mentioned co-pending application, the ingredients for making the ether resins may comprise a monohydric phenol and/or a monohalide. The ingredients (with or without the monovalent component) must however, be used in "polymerizing proportions", as this expression is defined in the co-pending application just referred to.

As the moistureproofing agent, it is possible to use any substance which will serve as the basis for moistureproofness. Such substances include synthetic or natural occurring waxes and wax-like materials. Among those moistureproofing agents of outstanding utility may be mentioned ceresin, beeswax, Chinese insect wax, and hydrocarbon waxes such as apple wax, and particularly paraffin waxes, such as those derived from petroleum, especially the higher melting varieties. If a hard wax is desired to improve the surface characteristics of the final sheet, film or coating, it may be advantageous to use a small amount of carnauba or candelilla wax or some similar hard wax.

In some instances, it may be desirable to add other resins or gums to the composition. While transparency can be attained usually without their use, it is frequently advantageous to add these resins or gums in the capacity of blending agents to improve the compatibility of the polyether resin and the moistureproofing agent with resultant improvement in transparency. Among the useful resins, gums and other blending agents, may be mentioned gum damar, rosin, ester gum, hydrogenated ester gum, B-naphthyl abietate, hydrogenated rosin, diethylene glycol hydrorosinate, dilauryl phthalate, halogenated diphenyl resins, or any other blending agent compatible with the polyether resin.

Frequently the flexibility may be improved by the addition of a plasticizing agent to the composition. When a plasticizer is used, it may be a compound or mixture of compounds having a relatively high boiling point and, of course, compatible with the polyether resin. Preferably the plasticizer will be odorless, tasteless and colorless. Dibutyl phthalate, dicyclohexyl phthalate, cyclohexyl-butyl phthalate, diamylphthalate, dixylyl ethane, B,B'-dicresoxy diethyl ether, halogenated diphenyls particularly the liquid varieties and certain of the well known sulfonamide type plasticizers such as p-toluene sulfonamide and its derivatives, may be useful as plasticizing agents.

The compositions described may be used most conveniently when dissolved in an appropriate solvent which may be a single substance or a mixture of substances. Aromatic hydrocarbons such as benzene, toluene, and xylene are preferred solvents although, if desired, the aromatic hydrocarbons may be replaced in part by aliphatic hydrocarbons, chlorinated hydrocarbons, or esters. The use of these compositions is not however limited to such solutions, for in many instances the use of a molten composition or an aqueous emulsion or dispersion in lieu of a solution, may be found advantageous. The use of a molten composition will eliminate the use of solvents and the attendant recovery problems, while an aqueous emulsion or dispersion may be useful where no other method can be permitted because of undesirability of solvents, heat or the like. When a melt is used, the temperature of the melt may be maintained at 100–200° C. and preferably 150–175° C. depending on the particular composition and the nature of the base or article to which the composition is being applied.

Other modifying agents may be employed to produce various effects. Thus colors, pigments or other decorative materials may be incorporated in the composition. It is obvious that where transparency is desired, nothing will be introduced which will be detrimental to this property.

One of the principal uses of these compositions lies in their application as coating compositions to various base materials. As such base materials the present invention contemplates any which may be preserved or protected by the several properties of the compositions. Thus, leather, fabrics, or fibers, whether natural or synthetic, may be rendered moistureproof, and metals or wood may likewise be protected. The coating compositions are especially useful when applied to cellulosic bases (sheets, tubes, caps, etc.), such as regenerated cellulose, glycol cellulose, cellulose glycollic acid, lowly etherified or lowly esterified celluloses (such as those containing only one substituent group for several cellulose units); cellulose derivatives including esters such as cellulose acetate, cellulose propionate, etc., mixed esters such as cellulose acetate-propionate; ethers and mixed ether-esters such as ethyl cellulose, benzyl cellulose, ethyl cellulose-acetate, etc.; various types of paper including bond, bank-note, "glassine", wrapping paper, rag or linen papers or any of the special highly porous absorbent papers. Other base materials may also be treated with benefit with the novel coating compositions. Among these are protein base materials such as gelatin or casein. Rubber and rubber derivatives are also suitable base materials.

The compositions described comprising a polyether resin and a moistureproofing agent are usually transparent, unless deliberately rendered translucent or opaque by means of modifying agents. The transparency of the final product obtained by applying the compositions as coatings will be, therefore, largely dependent on the transparency of the base material. Thus a sheet or film of regenerated cellulose bearing a coating of this type will remain of glass clear transparency. However, the transparency of porous bases may be markedly improved, as for instance when paper is chosen as the base the compositions are frequently capable of transparentizing action in addition to the other properties previously enumerated. If the transparency is of paramount importance, it is obvious that a relatively transparent base will be chosen and if a paper base must be used, one with a smooth surface is preferable, such as a highly calendered tissue or a "glassine" paper.

In using the new compositions of matter any of the methods well known to the art may be employed. When moistureproofing coating compositions of this type are being used, they may be applied to the base by dipping, spraying, roller coating or the like. Preferably, the coating is dried by means of warm air, the temperature of the drying chamber being approximately 90–110° C. The use of an elevated temperature is desirable when transparency and a high degree of moistureproofness are sought, the higher temperature serving to prevent separation or crystallization of the moistureproofing agent during the drying operation. It is frequently advantageous to subject the dried coated material to a humidifying atmosphere at an elevated temperature for a brief period in order to restore the proper amount of moisture to the base when the original moisture has been at least partially removed by the drying operation. Such a humidifying treatment may also serve to remove the last traces of solvent used in the application of the coating composition. A highly satisfactory method is set forth in the Church et al. patents, U. S. 1,737,187 and U. S. 1,826,696–9, inclusive, which may be used to advantage in the practice of this invention.

For the purpose of this specification and claims, I define moistureproof materials as those which, in the form of continuous, unbroken sheets or films, permit the passage of not more than 690 grams of water vapor per 100 square meters per hour, over a period of 24 hours, at approximately 39.5° C.±0.5° C., the relative humidity of the atmosphere at one side of the film being maintained at least at 98% and the relative humidity of the atmosphere at the other side being maintained at such a value as to give a humidity differential of at least 95%.

Moistureproofing coating compositions are defined as those which, when laid down in the form of a thin, continuous, unbroken film applied uniformly as a coating with a total coating thickness not exceeding 0.0005" to both sides of a sheet of regenerated cellulose of thickness approximately 0.0009", will produce a coated product which is moistureproof.

For the purposes of experimental tests, especially for those materials adaptable as coating compositions, moistureproof materials include those substances, compounds or compositions which, when laid down in the form of a continuous, unbroken film applied uniformly as a coating with a total coating thickness not exceeding 0.0005" to both sides of a sheet of regenerated cellulose of thickness approximately 0.0009", will produce a coated sheet which will permit the passage therethrough of not more than 690 grams of water vapor per 100 square meters per hour over a period of approximately 24 hours, at a temperature of 39.5° C.±0.5° C. (preferably 39.5° C.±0.25° C.) with a water vapor pressure differential of 50–55 mm. (preferably 53.4±0.7 mm.) of mercury. For convenience, the number of grams of water vapor passed under these conditions may be referred to as "the permeability value". An uncoated sheet of regenerated cellulose having a thickness of approximately 0.0009" will show a permeability value of the order of 6900.

From the foregoing, it is apparent that under the conditions set forth, a moistureproofed regenerated cellulose sheet is capable of resisting the passage of moisture or water vapor therethrough at least ten times as effectively as the uncoated regenerated cellulose sheet.

The following examples will serve to illustrate specific embodiments of the invention especially as it relates to moistureproofing coating compositions.

*Example I*

| | Parts by weight |
|---|---|
| Resin A | 15.0 |
| Paraffin wax (M. P. 63° C.) | 1.5 |
| Toluene | 85.0 |

This composition may be used for moistureproofing transparent sheets of regenerated cellulose by immersing the sheets in the solution or by otherwise coating them, removing the excess coating by suitable means, as by scraper rods, squeeze rolls or the like, and then drying, preferably at a temperature of 90–110° C. The coated sheet is substantially colorless, odorless and tasteless and has excellent surface characteristics of slip, non-tackiness and gloss as well as flexibility, oil and grease proofness, waterproofness, transparency and moistureproofness, showing a permeability value of about 15 or less.

*Example II*

| | Parts by weight |
|---|---|
| Resin B | 15.0 |
| Paraffin wax (M. P. 63° C.) | 1.5 |
| Toluene | 85.0 |

Sheets of cellulose acetate, coated with the above composition in the manner indicated under Example I result in a coated sheet which is transparent, flexible, waterproof, oil-proof, grease proof, non-tacky, of good surface characteristics, and moistureproof, the permeability value being of the order of 20 or less.

*Example III*

| | Parts by weight |
|---|---|
| Resin B | 10 |
| Hydrogenated ester gum | 2 |
| Paraffin wax (M. P. 63° C.) | 1 |
| Toluene | 80 |

Sheets of cellulose acetate coated with this composition in the manner described in Example I result in coated sheets having properties similar to those of the sheets described in Example II and which show permeability values of the order of 15 or less.

Example IV

| | Parts by weight |
|---|---|
| Resin A | 10 |
| Rosin | 1 |
| Dibutyl phthalate | 1 |
| Paraffin wax (M. P. 63° C.) | 1 |
| Toluene | 80 |

Sheets of regenerated cellulose coated with this composition in the manner of Example I yield a product similar to that of Example I with a permeability value of the order of 30 or less.

Example V

| | Parts by weight |
|---|---|
| Resin B | 11.4 |
| Dewaxed damar | 0.5 |
| Paraffin wax (M. P. 62–63° C.) | 1.0 |
| Toluene | 88.0 |

Sheets of bond paper may be coated with this composition in the same manner as described in Example I. The product is flexible, has excellent surface gloss and is moistureproof, having a permeability value of 40 or less. The greatest degree of moistureproofness is obtained when a sufficient amount of the lacquer is applied so that a continuous film of the composition is present on the surface of the paper. In certain instances a high degree of moistureproofness may not be required, in which cases the continuity of the coating is relatively unimportant. This may be true, for example, where moistureproofness of the paper fibers themselves rather than the paper sheet, is desired.

Example VI

| | Parts by weight |
|---|---|
| Resin B | 11.4 |
| Dewaxed damar | 3.0 |
| Dixylyl ethane | 0.8 |
| Paraffin wax (M. P. 62–63° C.) | 1.0 |
| Toluene | 88.0 |

This composition may be used for moistureproofing and transparentizing paper. A highly satisfactory transparentizing effect is achieved when the paper used is thin, smooth surfaced and of relatively porous structure, such as a thin calendered tissue. Sufficient moistureproofing composition must be used to seal all the pores of the paper and preferably also provide a continuous surface coating. When the composition of this example is applied as described in Example I, the product is transparent, flexible, waterproof, etc. and moistureproof, having a permeability value of 125 or less.

Example VII

| | Parts by weight |
|---|---|
| Resin B | 11.4 |
| Dewaxed damar | 2.0 |
| Paraffin wax (M. P. 51–52°C.) | 1.0 |
| Toluene | 88.0 |

Glassine paper may be coated with this composition in accordance with Example I to yield a flexible, transparent and moistureproof product (permeability value 250 or less). The addition of 0.1 part of zinc stearate, for example, will improve the surface slip obtainable with the composition.

Example VIII

| | Parts by weight |
|---|---|
| Resin B | 11.4 |
| Paraffin wax | 1.0 |
| Toluene | 88.0 |

Paper may be moistureproofed (permeability value 200 or less) by means of this composition.

As has been indicated above, paper is moistureproofed and in some cases transparentized by these new coating compositions. Certain other desirable characteristics are also provided, including oil-proofness, grease-proofness, waterproofness and the like.

The new compositions may be cast into self-sustaining structures such as sheets or films in much the same manner as cellulose derivative sheets (cellulose acetate, for example) are prepared. Unlike any hitherto known cellulose derivative sheet, however, the product may be cast with moistureproof properties in addition to its other desirable characteristics. The following example illustrates a suitable composition for casting films.

Example IX

| | Parts by weight |
|---|---|
| Resin A | 20.0 |
| Hydrogenated rosin | 3.0 |
| Dibutyl phthalate | 1.5 |
| Paraffin wax | 0.2 |
| Toluene | 78.0 |

This composition may be cast on a smooth surface such as a glass plate or highly polished metal surface, the solvent being eliminated by drying at a temperature of 90–110°C. The final film which may be stripped from the casting surface and which may have a thickness ranging from .0005–.0015 inch is transparent, flexible and moistureproof (permeability value 80 or less).

When using these new compositions as moistureproofing coatings, the desired effects may be obtained with the use of very thin coatings. Thus the total thickness of coating on both sides of a base may vary from 0.00001″ to 0.0005″ and still produce satisfactory results. It is not always necessary to coat both sides of a base in such cases, as for example with a coated paper, the thickness of coating on the one side may be of the same order as the total thickness when both sides are coated. For certain purposes thicker coatings may be desirable and hence the invention is not limited to those coating thicknesses described above.

While the above description is confined primarily to coating processes, the new moistureproofing compositions of this invention may also be used advantageously in the paper sizing art. This embodiment of the invention may be carried out by any of the methods known to the art including those described in pending application of J. A. Arvin, Ser. No. 713,945, filed March 3, 1934.

The above examples are indicative of suitable coating compositions but the proportions shown are not to be considered as limitative. Generally speaking, the transparency of the compositions, especially when laid down as sheets, films or other similar forms, is dependent on the compatibility of the particular polyether resin with the moistureproofing agent, on the ratio of moistureproofing agent to polyether resin, on the film thickness, and to a certain extent, at least in many cases, on the amount of resin or blending agent and/or plasticizing agent.

As regards the compatibility of the polyether resins with moistureproofing agents, it is generally true that they become more compatible as the hydrocarbon nature of the polyether resin becomes more pronounced. Thus, resin B is somewhat more compatible than resin A.

In like manner, the compatibility of the moistureproofing agent with the polyether resin is dependent to a considerable extent on the chemical constitution of the moistureproofing agent. Thus, low-melting paraffin waxes are more compatible with polyether resins than those of higher melting point. When the moistureproofing agent is largely aliphatic hydrocarbon, as is true in the case of paraffin waxes, the ratio of moistureproofing agent to polyether resin should not be greater than 1:8 if good transparency is desired. For the practice of the invention a ratio within the range of 1:8 to 1:300 will be found to provide satisfaction.

The film thickness contributes to transparency, especially when the composition may comprise only a polyether resin and a moistureproofing agent. Since the degree of transparency tends to decrease with increased coating thickness, it is preferable to apply relatively thin coatings, as previously indicated, although if transparency is not important, the coating may be of any desired thickness.

When large proportions of moistureproofing agent or greater film thickness are desired or where a composition is needed which will give more certainly reproducible transparency, a blending agent may be employed to advantage. The amount of blending agent will depend on the particular type of polyether resin, the moistureproofing agent and the ratio of these ingredients. Usually, it is desirable in the interest of a high degree of moistureproofness to employ only sufficient blending agent to render the product just transparent. An unnecessarily large quantity of blending agent prevents the utilization of the full moistureproofing power of the moistureproofing agent.

The amount of plasticizing agent will depend on the flexibility desired in the final product. In the majority of compositions the polyether resins are sufficiently plastic for practical purposes. If a softer product is desired, plasticizers may be added although the amount should not exceed 25%, based on the weight of polyether resin, if compositions are to be obtained which will remain free of stickiness at room or slightly elevated temperatures. The amount of plasticizer may vary through the range 0–25%, although where a plasticizer is needed, the amount will generally and preferably lie with the range of 5–8% based on the weight of polyether resin.

The new moistureproofing compositions which are an object of this invention have a number of advantages over those previously known to the art. For example, compositions can be prepared according to the invention which may contain only two components, the ether resin base and the moistureproofing agent. The formulation of such compositions is considerably less difficult than of those previously known to the art which comprise several additional components. Furthermore, the solvent required for these new compositions is an aromatic hydrocarbon or mixtures of aromatic hydrocarbons. This is very advantageous from an economic standpoint over the ester and ketone type solvents which are necessary for use in the preparation of many of the compositions already known to the art. The films or coatings obtained with the use of these new compositions have the desired properties in regard to transparency, flexibility, non-tackiness, and good surface slip. They are odorless, tasteless, and non-toxic. In addition they are unaffected by many chemical reagents because of the inertness of the ether resin base from which they are prepared, while the cellulosic derivatives which have been used for the formulation of compositions revealed in the prior art are not resistant to numerous chemical reagents, especially alkalies. Another advantage over prior art coatings which is possessed by the moistureproof coatings which are an object of this invention is their greater adhesion to the articles on which they are coated, especially when wet with water. These coatings also adhere extremely well to articles which are undercoated with any of the compositions known to the art, such as polybasic acid-polyhydric alcohol resin varnishes, phenolaldehyde resin varnishes, and the like. A still further advantage of these new moistureproof coatings is their very remarkable property of sealing under the influence of heat and slight pressure. Thus when two sheets of regenerated cellulose which have been moistureproofed with these compositions are placed in contact and touched with an iron at a temperature of 100–150° C. the two sheets will seal together and form an extremely secure union. Obviously this is very desirable when a number of parcels are to be wrapped and sealed as it eliminates the use of a solvent or an adhesive to secure the union. Still another advantage of these compositions is the fact that it is extremely easy to obtain highly moistureproof products with their use.

Wrapping tissues such as may be obtained through the practice of the present invention are especially adaptable to the wrapping and preservation of merchandise of all kinds in view of their flexibility, transparency, waterproofness, oilproofness, greaseproofness, good surface characteristics of gloss, slip, non-tackiness, etc. and particularly their moistureproofness which may in many cases be of a remarkably high order.

I claim:

1. A composition comprising a wax material and a film-forming component, said film-forming component consisting of the reaction product of di(4-hydroxyphenyl) dimethylmethane and B,B'-dichlorodiethyl ether said composition being capable of forming flexible, transparent, moistureproof, heat-sealable film.

2. A composition comprising a wax material and a film-forming component, said film-forming component consisting of the reaction product of di(4-hydroxy-3-methyl phenyl) dimethylmethane and B,B'-dichlorodiethyl ether said composition being capable of forming flexible, transparent, moistureproof, heat-sealable film.

3. A composition comprising a wax material and a film-forming component, said film-forming component consisting of the reaction product of 1,1-di(4-hydroxyphenyl) cyclohexane and B,B'-dichlorodiethyl ether said composition being capable of forming flexible, transparent, moistureproof, heat-sealable film.

4. A transparent, moistureproof, flexible, heat-sealable film containing a wax material and a film-forming component, said film-forming component consisting of the reaction product of di(4-hydroxyphenyl) dimethylmethane and B,B'-dichlorodiethyl ether.

5. A transparent, moistureproof, flexible, heat-sealable film containing a wax material and a film-forming component, said film-forming component consisting of the reaction product of di-(4-hydroxy-3-methyl phenyl) dimethylmethane and B,B'-dichlorodiethyl ether.

6. A transparent, moistureproof, flexible, heat-sealable film containing a wax material and a film-forming component, said film-forming component consisting of the reaction product of 1,1-di(4-hydroxyphenyl) cyclohexane and B,B'-dichlorodiethyl ether.

7. A composition comprising a film-forming substance and a wax material, said film-forming substance consisting of a polyether resin comprising the alkaline reaction product of a polyhydric phenol and an organic polyhalide whose halogen atoms are attached to different carbon atoms, said carbon atoms being joined to other atoms solely by single bonds said composition being capable of forming flexible, transparent, moistureproof, heat-sealable film.

8. A transparent, moistureproof, flexible, heat-sealable film containing a film-forming substance and a wax material, said film-forming substance consisting of a polyether resin comprising the alkaline reaction product of a polyhydric phenol and an organic polyhalide whose halogen atoms are attached to different carbon atoms, said carbon atoms being joined to other atoms solely by single bonds.

9. A transparent, moistureproof, flexible, heat-sealable film comprising a base having a coating thereon containing a film-forming substance and a wax material, said film-forming substance consisting of a polyether resin comprising the alkaline reaction product of a polyhydric phenol and an organic polyhalide whose halogen atoms are attached to different carbon atoms, said carbon atoms being joined to other atoms solely by single bonds.

10. A transparent, moistureproof, flexible, heat-sealable film comprising a regenerated cellulose base having a coating thereon containing a film-forming substance and a wax material, said film-forming substance consisting of a polyether resin comprising the alkaline reaction product of a polyhydric phenol and an organic polyhalide whose halogen atoms are attached to different carbon atoms, said carbon atoms being joined to other atoms solely by single bonds.

MERLIN MARTIN BRUBAKER.